United States Patent
Heiden et al.

[11] Patent Number: 6,143,227
[45] Date of Patent: Nov. 7, 2000

[54] METHOD FOR INJECTION MOLDING AN ARTICLE HAVING FILM COVERED FLANGES

[75] Inventors: James Heiden, Clinton; Mark Alan Harris, Dexter; Dale Moore, Plymouth; Zinoviy Chernyak, Farmington Hills, all of Mich.

[73] Assignee: Visteon Global Technologies, Inc., Dearborn, Mich.

[21] Appl. No.: 08/903,078

[22] Filed: Jul. 30, 1997

[51] Int. Cl.⁷ ...................................................... B29C 45/16
[52] U.S. Cl. .......................... 264/267; 264/318; 264/334; 475/127; 475/129.1; 475/438; 475/442; 475/DIG. 58
[58] Field of Search .................................... 264/267, 328, 264/334; 475/129.1, 577, 438, 442, 443, DIG. 58, 112, 117, 127

[56] References Cited

U.S. PATENT DOCUMENTS

| | | |
|---|---|---|
| 3,668,034 | 6/1972 | Nicholas et al. . |
| 4,136,150 | 1/1979 | Darnall, Jr. . |
| 4,650,533 | 3/1987 | Parker et al. . |
| 4,769,100 | 9/1988 | Short et al. . |
| 4,822,553 | 4/1989 | Marshall ................................ 264/318 |
| 4,854,849 | 8/1989 | Sudo ...................................... 264/318 |
| 4,902,557 | 2/1990 | Rohrbacher . |
| 4,913,760 | 4/1990 | Benson et al. . |
| 4,956,142 | 9/1990 | Mangone, Jr. .......................... 425/442 |
| 4,976,896 | 12/1990 | Short et al. . |
| 5,034,077 | 7/1991 | Pata . |
| 5,034,269 | 7/1991 | Wheeler . |
| 5,037,680 | 8/1991 | Papendick et al. . |
| 5,055,346 | 10/1991 | Rohrbacher . |
| 5,114,789 | 5/1992 | Reafler . |
| 5,125,994 | 6/1992 | Harasta et al. . |
| 5,183,615 | 2/1993 | Zushi . |
| 5,192,609 | 3/1993 | Carroll, Jr. . |
| 5,208,081 | 5/1993 | Gübitz et al. . |
| 5,215,811 | 6/1993 | Reafler et al. . |
| 5,215,826 | 6/1993 | Shimanski et al. . |
| 5,248,364 | 9/1993 | Liu et al. . |
| 5,271,352 | 12/1993 | Wilson . |
| 5,342,666 | 8/1994 | Ellison et al. . |
| 5,350,473 | 9/1994 | Weder et al. . |
| 5,435,865 | 7/1995 | Lee et al. . |
| 5,500,169 | 3/1996 | Kondo et al. ........................... 264/46.5 |
| 5,514,427 | 5/1996 | Ellison et al. . |
| 5,536,539 | 7/1996 | Ellison et al. . |
| 5,538,576 | 7/1996 | Knop et al. . |
| 5,585,187 | 12/1996 | Shinonaga et al. . |
| 5,599,608 | 2/1997 | Yamamoto et al. . |
| 5,650,115 | 7/1997 | Proos et al. ............................. 264/400 |

FOREIGN PATENT DOCUMENTS

| | | |
|---|---|---|
| 0 042 782 | 12/1981 | United Kingdom . |
| 0 161 589 | 11/1985 | United Kingdom . |
| 0 510 414 | 10/1992 | United Kingdom . |

*Primary Examiner*—Jan H. Silbaugh
*Assistant Examiner*—Edmund H. Lee
*Attorney, Agent, or Firm*—Larry I. Shelton

[57] ABSTRACT

A method and apparatus for manufacturing a film-covered flange having the following steps. An injection molding press having a mold cavity and a core receives a pre-molded thermoformed film. The film is formed to have an in-turned flange portion that will form the covering for the final article. The film is placed within the mold cavity. The core has a slide movable between retracted and extended positions. The slide is retracted and the core is moved within the mold cavity. After the press is closed the slide is moved from the retracted position to the extended position. The slide includes a recessed portion that lies opposite the flange portion to create a space therebetween. A molten plastic material is injected into the space. The plastic material adheres to the flange portion and forms an article having a covered flange.

1 Claim, 5 Drawing Sheets

METHOD FOR INJECTION MOLDING AN ARTICLE HAVING FILM COVERED FLANGES

RELATIVE APPLICATIONS

This application is related to commonly assigned U.S. patent application Ser. No. 08/903,113, now abandoned, titled: "METHOD AND APPARATUS FOR MANUFACTURING AN ACUTE ANGLE FILM-COVERED FLANGE, filed on even date herewith and incorporated by reference.

BACKGROUND OF INVENTION

1. Field of the Invention

Present invention is directed to a method and apparatus for forming a film-covered flange. More specifically, the present invention is directed to providing a core with a moveable slide that overlies a flange portion of the film to form the film-covered flange.

2. Description of the Related Arts

It is also known to manufacture molded articles using flexible films wherein the film is placed within a mold and a polymer is injected behind the film to heat and soften the film backing. The film backing fuses to the polymer to form a molded article. An example of this type of method is taught in U.S. Pat. No. 3,668,034. One difficulty in manufacturing molded articles using pre-molded flexible films, is properly positioning the flexible film within the mold so that it is free of wrinkles or creases and is precisely positioned in the cavity to register with the contours to form the desired article. Heretofore, proper placement of the pre-molded film within the cavity has been a major stumbling block to widespread application of pre-molded films. The problem is especially acute when handling pre-molded thin films for large automotive applications such as bumper facias. The entire surface area of the film must be properly positioned within the cavity to produce a defect-free article. Slight misalignments will cause wrinkles or defects and make the article unusable.

It is necessary to precisely place the film between the operable core and cavity pieces of a molding press. Because these operable pieces open and close, it is advantageous to provide a mechanism which allows the pre-molded film to be robotically placed within the mold cavity rather than manual placement by an operator. It is a further desired result of the present invention to utilize existing equipment for removing the molded article from the core in the method for placing the pre-molded film within the mold. It is also desired that the method and apparatus utilize existing molding equipment to the maximum extent possible. This includes utilizing a mold press and core with a limited opening there between. It is further desirable to manufacture an article having a flange in a tool that is subject to "die-lock" conditions. Die-lock conditions occur when either the mold cannot be opened or when the part cannot be removed from the mold.

It is desirable to form articles with flange portions. The flange acts as a mechanism to attach the article and to provide the article with additional strength or rigidity. When used in exterior automotive applications such as bumper facias, the flange is abutted an adjacent component. A portion of the flange remains visible. The appearance of the flange should match that of adjacent components. In most cases, these flange portions are painted to match the rest of the facia. A difficulty arises when manufacturing these components using a pre-painted film. The film must wrap around the flange.

It is known to form a covered edge using in-mold films. An example of this construction is illustrated in U.S. Pat. No. 5,599,608. A film having a re-entrant edge portion is placed within a mold. A mold is moved to contact the core. The core engages the re-entrant portions and folds them within the mold cavity. Molten plastic is injected into the mold cavity and the combination of closing the mold combined with the pressure of the molten plastic material forces the re-entrant edge portions against the mold wall to form the covered edge of the molded article.

The method described in U.S. Pat. No. 5,599,608 is limited to forming an edge portion having a width equal to the thickness of the substrate. This is useful when forming a part having a covered edge, but not useful when forming a part having a covered flange. A flange requires a space behind it. This space is known as an undercut. The 5,599,608 patent does not teach forming parts having an undercut.

It is also known to include pins or slides in the core to assist in removing the article from the mold. The plastic forms around the pin or slide and the article remains with core when the press is opened. What has not been shown, is the use of a slide to provide both an undercut and to assist in removing the article from a mold.

These deficiencies and problems are overcome by the present invention.

SUMMARY OF THE INVENTION

The present invention is directed to a method of manufacturing a film-covered flange comprising the following steps. An injection molding press having a mold cavity and a core receives a pre-molded thermoformed film. The film is formed to have an in-turned flange portion that will form the covering for the final article. The film is placed within the mold. The core has a slide movable between retracted and extended positions. The slide is retracted and the core is moved within the mold. After the press is closed, the slide is moved from the retracted position to the extended position. The slide includes a recessed portion that lies opposite the flange portion to create a space there between. A molten plastic material is injected into the space. The plastic material adheres to the flange portion of the pre-molded thermoformed film and forms an article having a covered flange.

The invention also includes an apparatus for forming an article having a film-covered flange. The apparatus includes a moveable press having a mold cavity and a core. The core has a slide movable between retracted and extended positions. The slide includes a recessed portion. The cavity receives a thermoformed film having a flange portion. The slide includes a recessed portion that is opposite the flange portion when the press is closed and when the slide is moved to the extended position. The recessed portion and flange portion define a space. A resin inlet injects a molten plastic material into the space. The molten plastic material adheres to the flange portion to form an article having a film-covered flange.

The slide may be moved linearly or in an arcuate path. The slide retains the article on the core and removes the article from the mold. The slides retract releasing the molded article.

In an alternative embodiment of the present invention, the mold cavity is subject to die-lock and the core extends and retracts to withdraw the article from the mold cavity. The article flexes to pass through the die-lock and is removed from the cavity.

The invention enables the manufacture of film-covered articles having a covered flange portion. It is another advantage of the present invention to provide a core with moveable slides that forms the flange and retains the article on the core.

These and other desired objects of the present invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
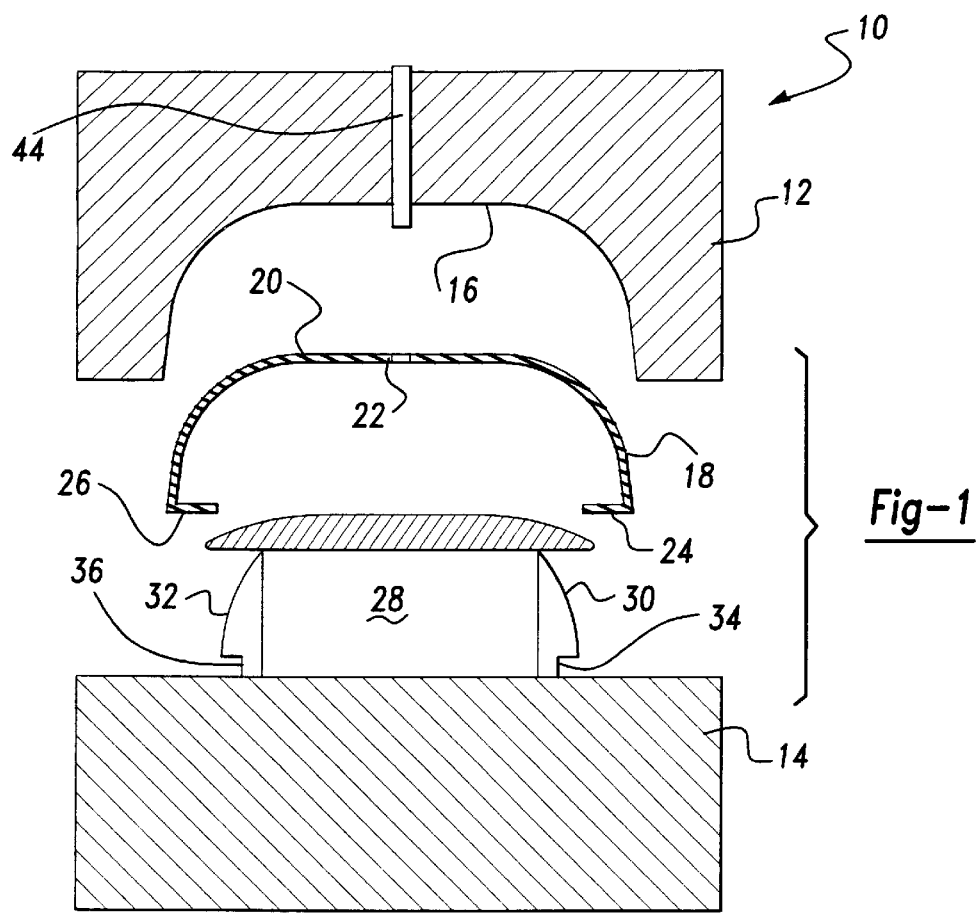
FIG. 1 is a cross-sectional view of an open mold.

The present invention will be described through a series of drawings, which illustrate a molding of a flexible film having an in-turned flange portion using a core having one or more moveable slides. The invention will be illustrated as molding an automotive bumper facia. Other components such as instrument and door panels may be manufactured using the same or similar technique and equipment and are included within the invention described herein. The following items are a word list of the items described in the drawings and are reproduced to aid in understanding the invention:

| 10 | press |
|---|---|
| 12 | mold cavity |
| 12' | mold cavity |
| 14 | core |
| 14' | core |
| 16 | cavity surface |
| 18 | film |
| 20 | painted surface |
| 22 | backing sheet |
| 24 | flange portion |
| 26 | flange portion |
| 28 | main body |
| 30 | linear slide |
| 30' | arcuate slide |
| 30" | linear slide |
| 32 | linear slide |
| 32' | arcuate slide |
| 32" | linear slide |
| 34 | recessed portion |
| 34' | recessed portion |
| 36 | recessed portion |
| 36' | recessed portion |
| 38 | piston |

| -continued | |
|---|---|
| 40 | piston |
| 42 | injecting space |
| 44 | resin inlet |
| 46 | article |
| 48 | covered flange |
| 50 | covered flange |

Illustrated in FIG. 1 is a moveable mold press 10 having a cavity 12 and a moveable core 14. The mold cavity 12 has an interior surface 16 that imparts a shape on a molded article. The mold cavity 12 receives a pre-molded flexible thermoformed film 18. The film 18 may be either a thin film such as Avloy™ manufactured by Avery Dennison or ISF™ manufactured by 3M/Rexam. Alternatively, the film may be a thick film such as polyvinyl chloride or thermoplastic urethane as is normally used in automotive trim applications. Other types of film are also useful in the present invention. The film 18 has a painted surface 20 and a backing sheet 22. The film 18 is placed within the mold cavity 12 using an automated film loader (not shown). An example of a suitable automated film loader is illustrated and described in co-pending U.S. patent application Ser. No. 08/903,523 titled: METHOD AND APPARATUS FOR LOADING A PRE-MOLDED FILM INTO A MOLD, which is incorporated herein by reference. The painted surface 20 is juxtaposed the cavity surface 16.

The film 18 includes two in-turned flange portions 24, 26. The flange portions 24, 26 are formed on the film 18 during the thermoforming operation (not shown). The flange portions 24, 26 cover a flange on the finished molded article. The space between the flange portions 24, 26 is generally smaller than the cavity opening. The flange portions 24, 26 are relatively fragile and are easily damaged by contact with the core 14.

Figure 2:
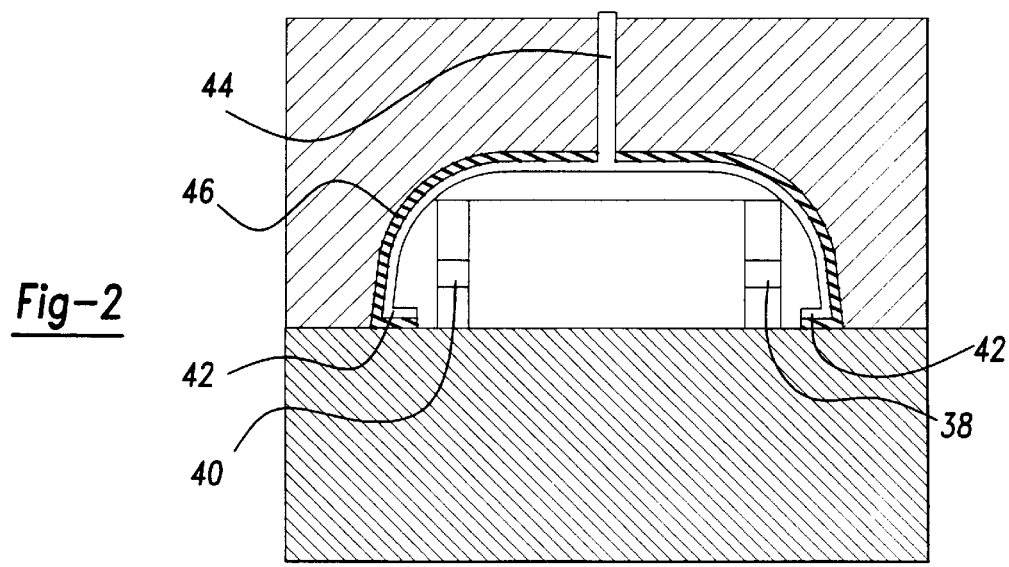
FIG. 2 is a cross-sectional view of the mold illustrated in FIG. 1 in the closed position injecting molten plastic behind a film.

The core 14 includes the main body 28 and moveable slides 30, 32. The slides 30, 32 include recessed portions 34, 36. The recessed portions 34, 36 form an undercut for the article flange. The slides 30, 32 are retracted as illustrated in FIG. 1 to provide a narrow profile that allows the core 14 to pass between the flange portions 24, 26. After the core 14 is moved within the mold cavity 12 and the press 10 is closed, the slides 30, 32 are extended as illustrated in FIG. 2.

The slides 30, 32 move linearly by the pistons 38, 40. The recessed portions 34, 36 are positioned opposite the flange portions 24, 26 to create a injecting space 42 there between. A resin inlet 44 injects molten plastic material into the injecting space 42. The plastic material heats and softens the backing sheet 22 and adheres thereto. The plastic material forms an article 46 having covered flanges 48, 50.

Figure 3:
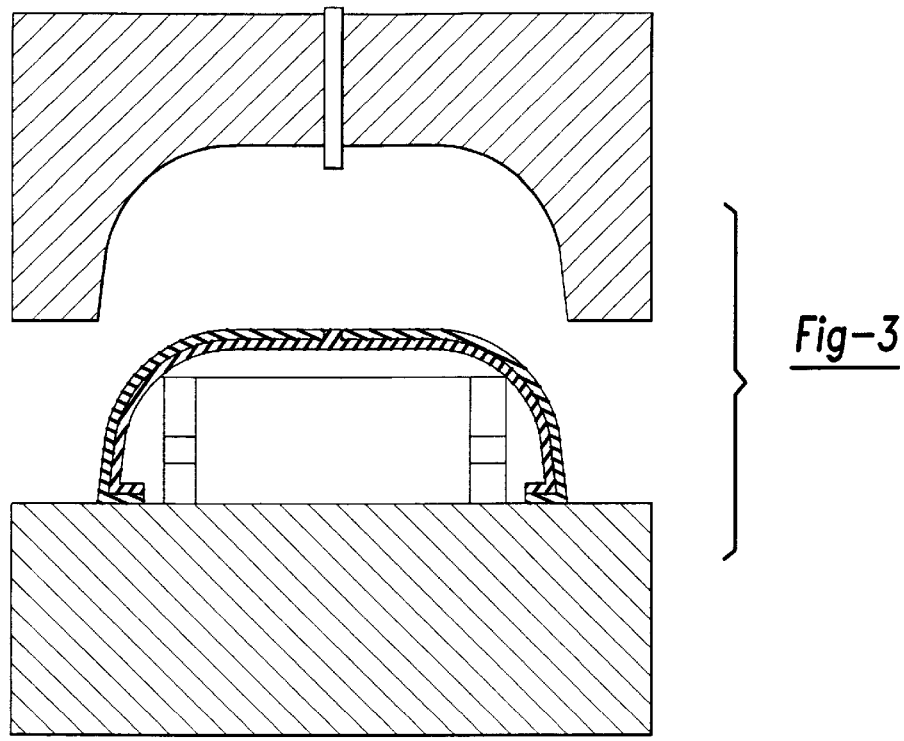
FIG. 3 is a cross-sectional view of the mold illustrated in FIG. 1 in the open position and retaining the molded article on the core.
Figure 4:
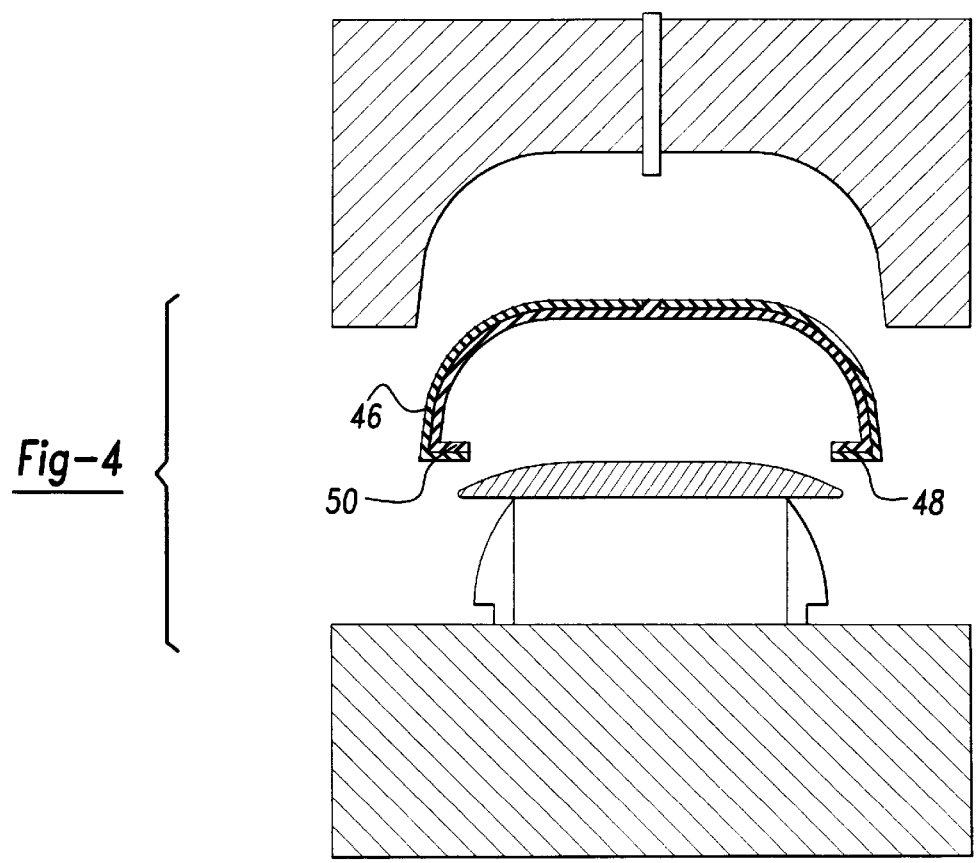
FIG. 4 is a cross-sectional view of the mold illustrated in FIG. 1 with the slides retracted and releasing the molded article.

After the article 46 cools, the press 10 is opened as illustrated in FIGS. 3 and 4. The article 46 remains on the core 14 because the flanges 48, 50 are contained within the recessed portions 34, 36. It is desirable that the article 46 remain on the core 14 because it enables removing the article 46 using existing automated unloading equipment. After the press 10 is moved to the open position, the pistons 38, 40 move the slides 30, 32 to the retracted position as illustrated in FIG. 4. The article 46 is released from the core 14 and removed from the press 10.

Figure 5:
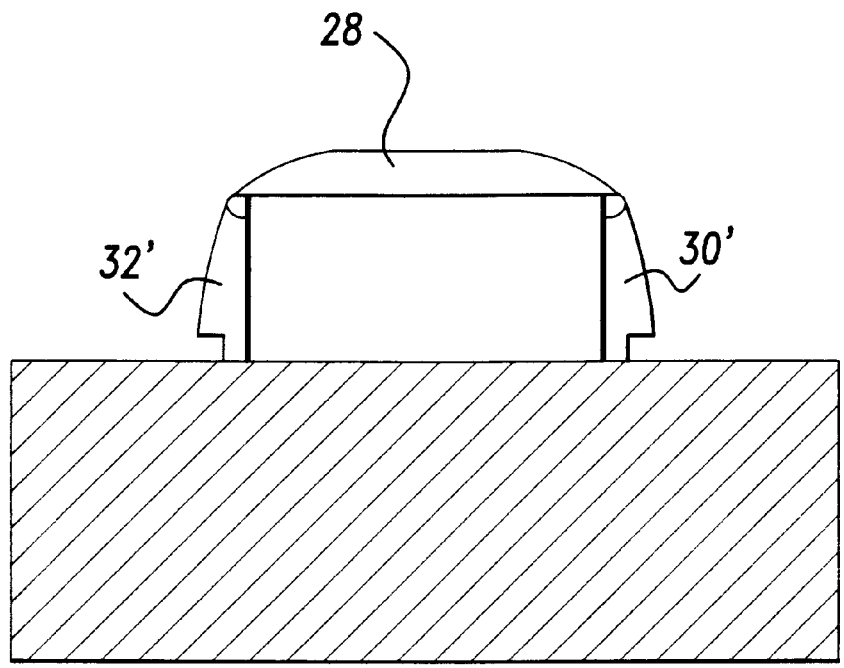
FIGS. 5 and 6 are cross-sectional views of an alternative embodiment of the present invention using slides that move in an arcuate path.
Figure 6:
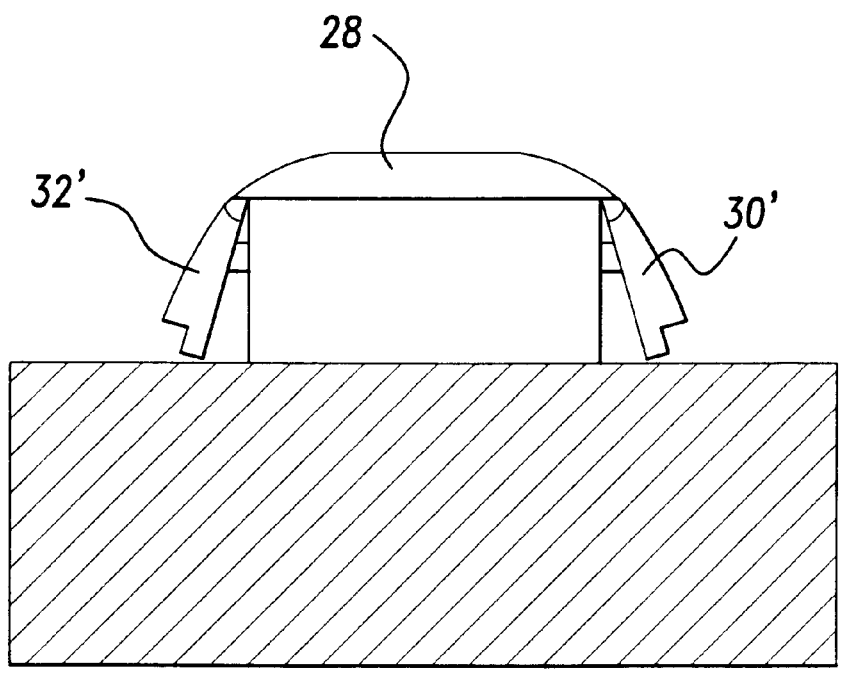

The invention as illustrated in FIGS. 1-4 uses linearly moving slides 30, 32. In some applications, it may be preferable to use slides that move in an arcuate path as illustrated in FIGS. 5, 6. The slides 30', 32' are hinged to the main body 28. The slides 30', 32' are moved between retracted and extended positions by the pistons 38, 40.

Figure 7:
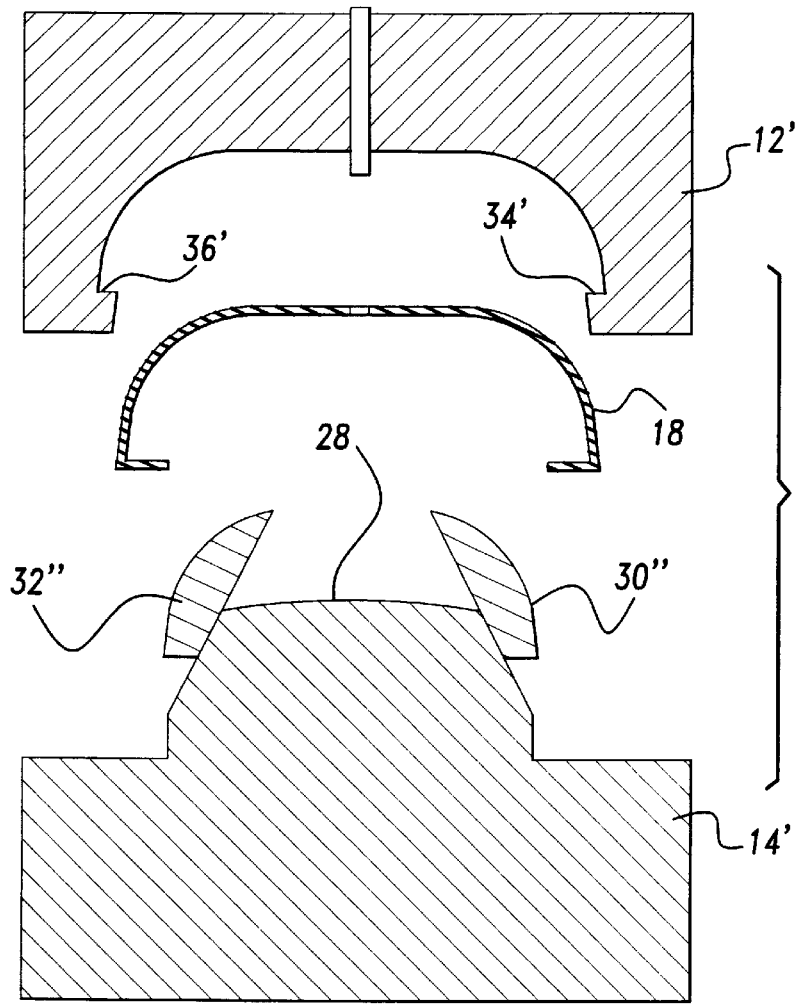
FIGS. 7-9 are cross-sectional views of yet another alternative embodiment of the present invention using a mold cavity having a die-lock condition.
Figure 8:
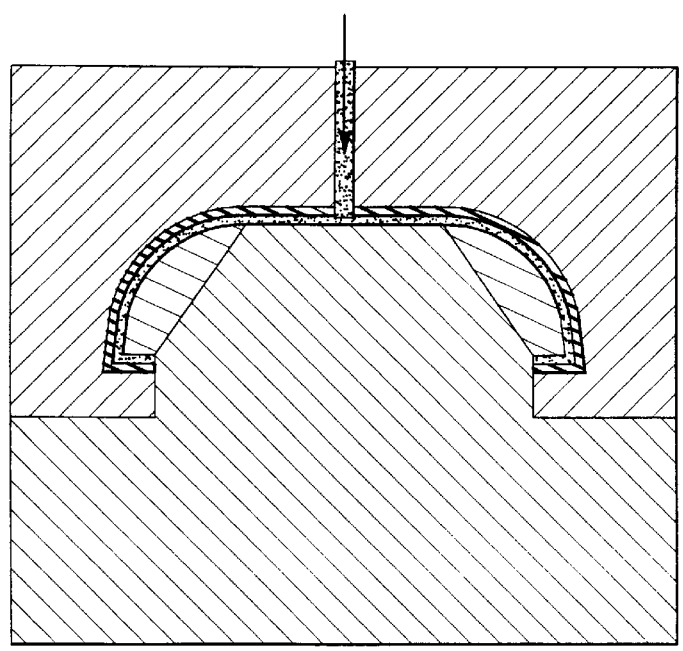
Figure 9:
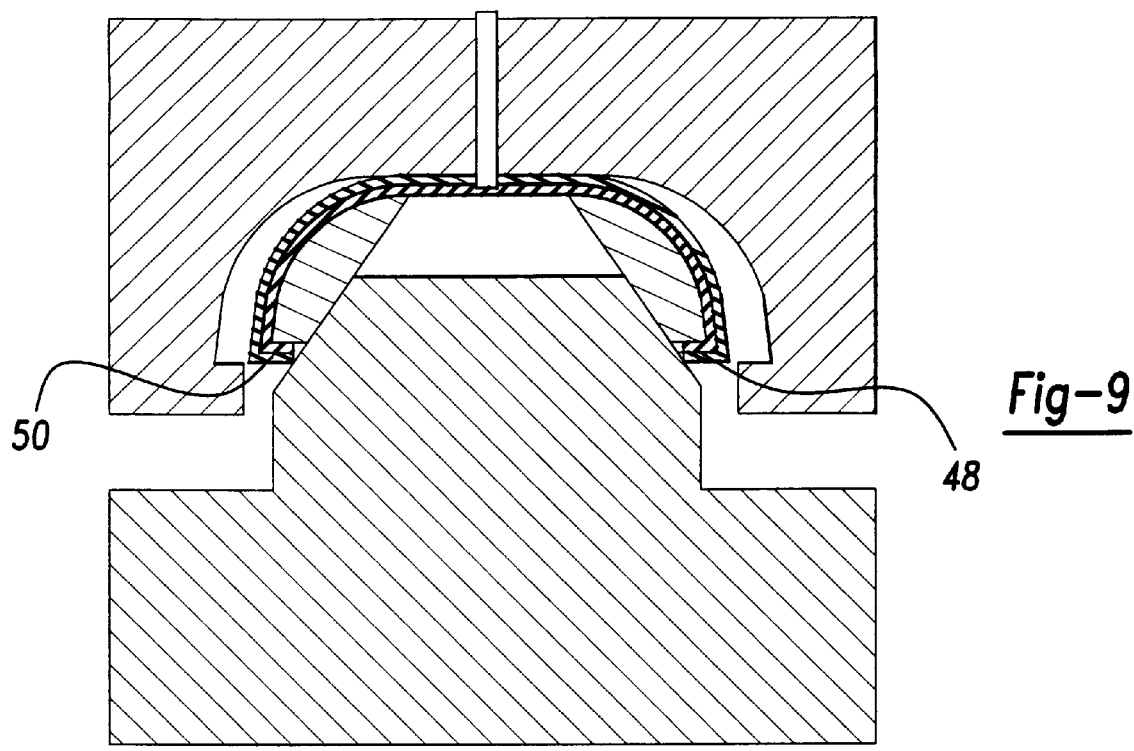

The embodiment illustrated in FIGS. 7–9 uses a mold cavity 12' that has a die-lock condition. The cavity 12' includes recessed portions 30", 32" that form the flange portions on the molded article. The core 14' includes movable slides 30", 32". The slides 30", 32" move forwardly and inwardly of the main body 28 to create a narrower profile to fit within the mold cavity 12' as shown in FIG. 7. The slides 30", 32" are in a retracted position and to an extended position when the core 14' is moved to the closed position as shown in FIG. 8. After the article is molded, the core 14' is moved to the open position as shown in FIG. 9. As the core 14' moves to the open position, the slides are moved to the retracted position. To remove the article from the cavity 12', the covered flanges 48, 50 are retained on the slides 30", 32" by pins as is well known in the art. The flanges 48, 50 bend inwardly on the slides 30", 32" to have a narrower profile to be removed from the cavity 12'.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed is:

1. A method of manufacturing an article having film-covered flanges comprising the steps of:

providing a moveable press having a mold with a cavity and a core, said core having two spaced slides movable between retracted and extended positions, said slides including recessed portions;

placing a thermoformed film within said cavity, said film having two inwardly turned spaced flange portions, the space between said flange portions defining a flange spacing;

positioning said slides in said retracted position so that the space between said recessed portions of the retracted slides is narrower than said flange spacing;

closing said press and moving said core into said cavity while said slides are in said retracted position;

moving said slides from said retracted position to said extended position in said cavity, said recessed portions of said slides thereby contacting said flange portions, said core with said slides in said extended position and thermoformed film with said flange portions defining an injecting space therebetween, said injecting space extending between said flange portions and said slides; and injecting a molten plastic material into said injecting space, said plastic material adhering to said flange portions and forming said article having film-covered, inwardly turned flanges.

* * * * *